(12) United States Patent
Suh et al.

(10) Patent No.: US 7,688,684 B2
(45) Date of Patent: Mar. 30, 2010

(54) HEAT-ASSISTED MAGNETIC RECORDING HEAD AND RECORDING APPARATUS INCLUDING THE SAME

(75) Inventors: Sung-dong Suh, Seoul (KR); Eun-hyoung Cho, Seoul (KR); Jin-seung Sohn, Seoul (KR); Hyun-jei Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 209 days.

(21) Appl. No.: 11/747,287

(22) Filed: May 11, 2007

(65) Prior Publication Data

US 2008/0089187 A1  Apr. 17, 2008

(30) Foreign Application Priority Data

Oct. 17, 2006  (KR) ...................... 10-2006-0101044

(51) Int. Cl.
*G11B 11/00* (2006.01)
*G11B 5/02* (2006.01)

(52) U.S. Cl. ...................................... 369/13.01; 360/59
(58) Field of Classification Search .............. 369/13.02, 369/13.22, 13.24, 13.26, 13.28–13.32, 112.01, 369/112.02, 112.05, 112.22, 112.27–112.29; 360/59
See application file for complete search history.

(56) References Cited

U.S. PATENT DOCUMENTS

| | | | | |
|---|---|---|---|---|
| 6,064,615 A | * | 5/2000 | Gudesen | 369/275.1 |
| 6,631,227 B2 | * | 10/2003 | Kasama et al. | 369/44.15 |
| 6,714,370 B2 | * | 3/2004 | McDaniel et al. | 369/13.02 |
| 2004/0120064 A1 | * | 6/2004 | Dugas et al. | 360/59 |
| 2005/0157595 A1 | * | 7/2005 | Tawa et al. | 369/13.02 |
| 2006/0143635 A1 | * | 6/2006 | Liu et al. | 360/59 |
| 2007/0070824 A1 | * | 3/2007 | Nishida et al. | 369/13.24 |

FOREIGN PATENT DOCUMENTS

| | | |
|---|---|---|
| JP | 2003-6803 A | 1/2003 |
| KR | 2003-0078519 A | 10/2003 |

* cited by examiner

*Primary Examiner*—Hoa T Nguyen
*Assistant Examiner*—Jesse Hauck
(74) *Attorney, Agent, or Firm*—Sughrue Mion, PLLC

(57) ABSTRACT

A heat-assisted magnetic recording head and a recording apparatus including the same are provided. The heat-assisted magnetic recording head includes a recording portion which produces magnetic field for recording information to a magnetic recording medium, and a waveguide which transmits light therethrough disposed to be adjacent to the recording portion and which emits the light toward the magnetic recording medium, wherein the waveguide comprises a light incident surface; a tapered portion having progressively narrower sections along the transmission direction of the light incident on the light incident surface and entering the waveguide; and a light-emitting surface which emits the light after the light is transmitted through the tapered portion.

15 Claims, 7 Drawing Sheets

HEAT-ASSISTED MAGNETIC RECORDING HEAD AND RECORDING APPARATUS INCLUDING THE SAME

CROSS-REFERENCE TO RELATED PATENT APPLICATIONS

This application claims priority from Korean Patent Application No. 10-2006-0101044, filed on Oct. 17, 2006, in the Korean Patent Intellectual Property Office, the disclosure of which is incorporated herein in its entirety by reference.

BACKGROUND OF THE INVENTION

1. Field of the Invention

Apparatuses consistent with the present invention relate to a heat-assisted magnetic recording head and, more particularly, to a heat-assisted magnetic recording head for heating a magnetic recording medium locally by irradiating a light beam, and a recording apparatus including the same.

2. Description of the Related Art

Extensive research has been conducted into methods of enhancing recording density in the field of magnetic information recording. In order to enhance recording density, the size of bits of a magnetic recording medium must be reduced, and transition noise must be reduced by making the size of grains constituting the bits smaller.

Meanwhile, in order to retain information recorded on a magnetic recording medium stably, the coercive force of the magnetic recording medium must be sufficiently large. However, in the case of a magnetic recording medium having a large coercive force, information recording may be impossible due to the limitation of the strength of a magnetic field generated by a magnetic recording head. In order to overcome this problem, a heat-assisted magnetic recording head has been devised. A heat-assisted magnetic recording head is a magnetic recording head by which a magnetic recording medium is locally heated to reduce the coercive force so that the magnetic recording medium can be easily magnetized by a weak magnetic field. Recently, research has been conducted on a heat-assisted magnetic recording head employing a method in which a magnetic recording medium is heated by irradiating a light beam.

FIG. 1 is a schematic diagram illustrating an example of a recording apparatus 1 including a related art heat-assisted magnetic recording head 15. Referring to FIG. 1, the heat-assisted magnetic recording head 15 is formed at one end portion of a slider 10 which can maintain a floating state from a magnetic recording medium 2 and move to a particular track of the magnetic recording medium 2 while the recording apparatus 1 is operated. An air-bearing surface (ABS) 13 is formed at a surface of the slider 10 facing the magnetic recording medium 2. During the operation of the recording apparatus 1, the magnetic recording medium 2 rotates at high speed, and therefore air flows at high speed between the air-bearing surface 13 and the magnetic recording medium 2. While flowing beneath the air-bearing surface 13, the high-speed airflow provides an upward force to the slider 10 such that the slider 10 separates further from the magnetic recording medium 2. The slider 10 maintains a floating state at a height at which the upward force provided by the high-speed airflow and the elastic pressure of a suspension (not shown) elastically supporting the slider 10 can be in an equilibrium state.

The heat-assisted magnetic recording head 15 includes a waveguide 16 and a grating coupler 17 formed on a front surface of the waveguide 16. Light beams Lo emitted by an external light source (not shown) are absorbed into the waveguide 16 by means of the grating coupler 17, are transmitted along the waveguide 16, and are emitted toward the magnetic recording medium 2 (please refer to Ls).

However, the recording apparatus 1 must comprise a complicated collimating means (not shown) for directing the light beams Lo toward the grating coupler 17. In addition, even though the recording apparatus 1 comprises the complicated collimating means, since even a minute shaking of the slider 10 and the relatively large size of light beams prevent some light beams from being absorbed into the waveguide 16, loss of light beams is relatively large. Further, since light beams not absorbed into the waveguide 16 are diffusedly reflected off the grating coupler 17 and travel to the magnetic recording medium 2 and the diffusedly reflected light beams Lr affect magnetization states of the magnetic recording medium 2, noise may be generated.

SUMMARY OF THE INVENTION

Exemplary embodiments consistent with the present invention provide a heat-assisted magnetic recording head having a waveguide designed to reduce light transmission loss, and a recording apparatus including the same.

According to an aspect of the present invention, there is provided a heat-assisted magnetic recording head comprising: a recording portion which produces a magnetic field for recording information to a magnetic recording medium; and a waveguide which transmits light therethrough disposed to be adjacent to the recording portion and which emits the light toward the magnetic recording medium wherein the waveguide comprises: a light incident surface; a tapered portion having progressively narrower sections along the transmission direction of light incident on the light incident surface and entering the waveguide; and a light-emitting surface which emits the light after the light is transmitted through the tapered portion.

The present invention also provides a recording apparatus including the heat-assisted magnetic recording head.

The waveguide may further comprise an S-shaped bent portion at an end of the tapered portion.

When one surface of the heat-assisted magnetic recording head facing the magnetic recording medium is a lower side surface, the light incident surface may be disposed on one of a left side surface and a right side surface of the heat-assisted magnetic recording head, and the distance from the magnetic recording medium to a lower end of the light incident surface is equal to or greater than the distance from the magnetic recording medium to the light-emitting surface.

The waveguide may further comprise a light reflective surface at an end of the S-shaped bent portion for redirecting light toward the light-emitting surface.

When one surface of the heat-assisted magnetic recording head facing the magnetic recording medium is a lower side surface, the light incident surface may be disposed on an upper side surface of the heat-assisted magnetic recording head.

The heat-assisted magnetic recording head may further comprise a reproducing portion for reproducing information recorded in the magnetic recording medium, such that the waveguide is interposed between the recording portion and the reproducing portion.

The heat-assisted magnetic recording head may further comprise a nano-aperture for producing an enhanced near-field by changing energy distribution of the light emitted through the light-emitting surface.

On the other hand, in the recording apparatus, the optical transmission medium may comprise a Graded Index (GRIN) fiber whose refractive indices decrease gradually in radial directions from a center portion to circumferential portions of the GRIN fiber.

The optical transmission medium may comprise a step index fiber and a GRIN lens connected to an end of the step index fiber.

The optical transmission medium may further comprise a light reflective surface at an end thereof for redirecting light toward the light incident surface of the waveguide.

BRIEF DESCRIPTION OF THE DRAWINGS

The above aspects and advantages of the present invention will become more apparent by describing in detail exemplary embodiments thereof with reference to the attached drawings, in which.

DETAILED DESCRIPTION OF EXEMPLARY EMBODIMENTS OF THE INVENTION

Hereinafter, a heat-assisted magnetic recording head according to exemplary embodiments of the present invention and a recording apparatus including the same will be described in detail with reference to the accompanying drawings.

Figure 1:
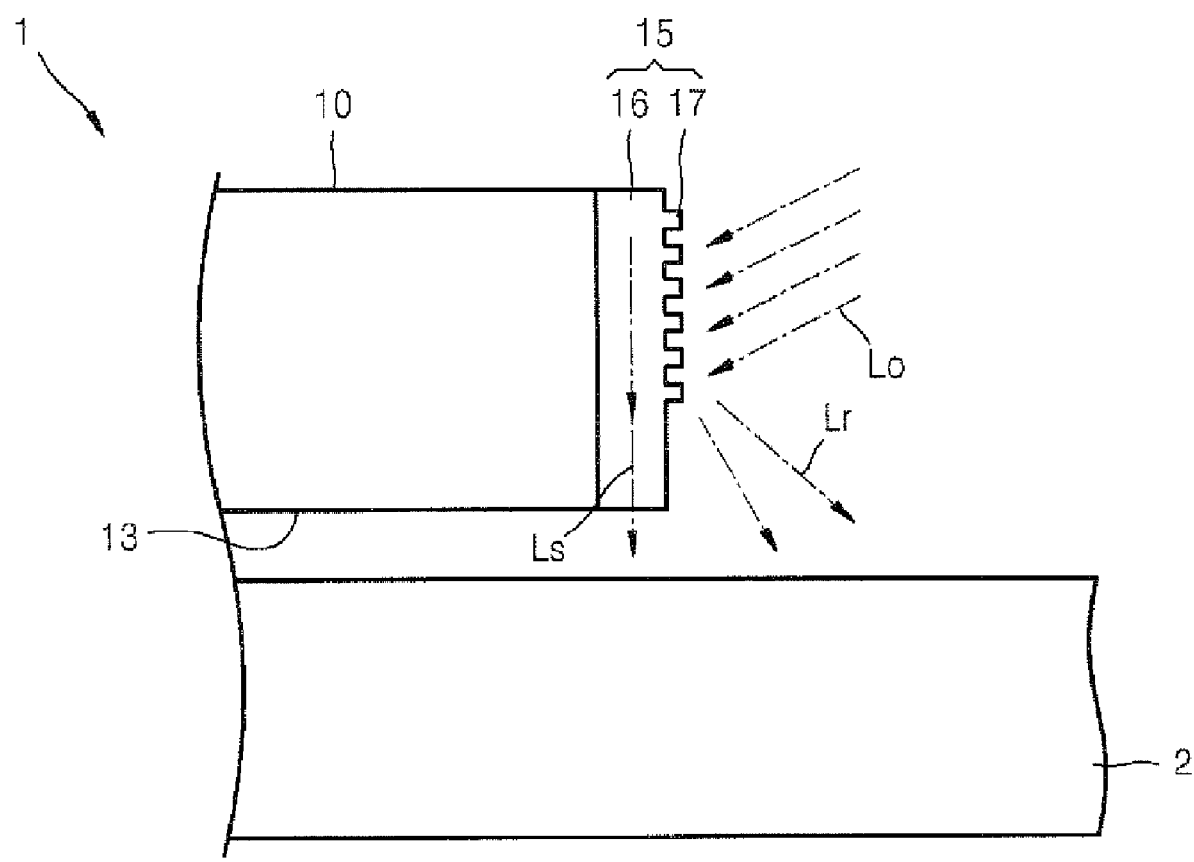
FIG. 1 is a schematic diagram illustrating an example of a recording apparatus having a related art heat-assisted magnetic recording head.
Figure 2:
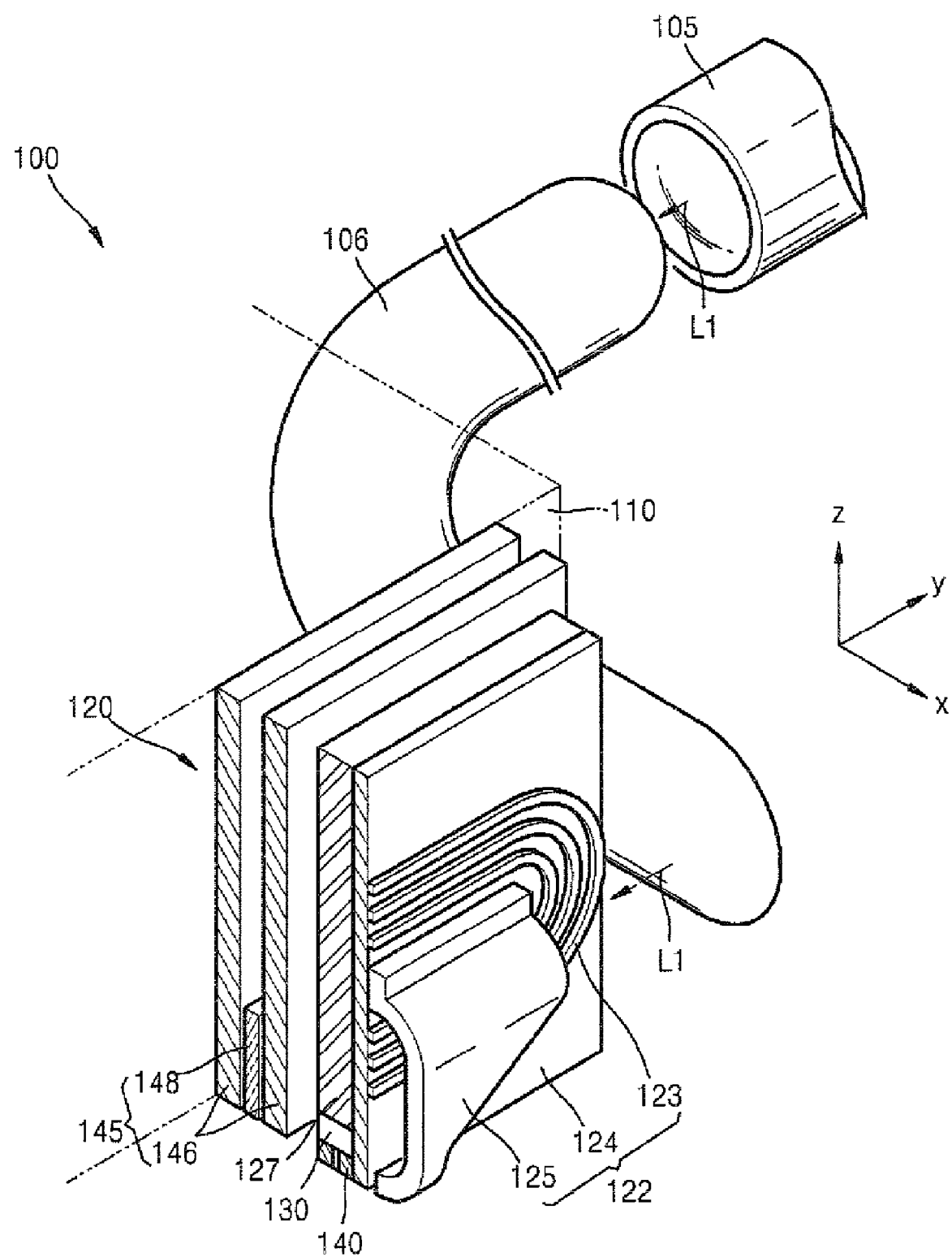
FIG. 2 is a perspective view illustrating a heat-assisted magnetic recording head according to an exemplary embodiment of the present invention, and a recording apparatus including the heat-assisted magnetic recording head, according to an exemplary embodiment of the present invention.
Figure 3:
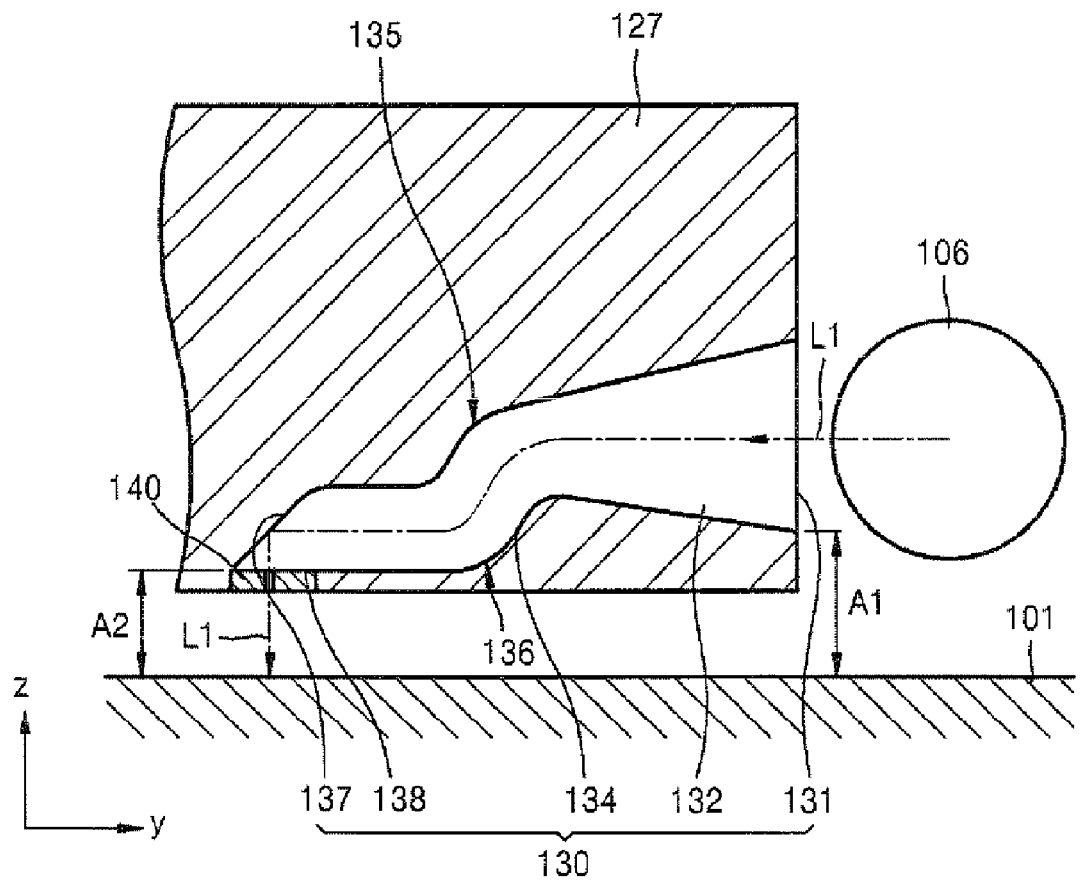
FIG. 3 is a sectional view illustrating a waveguide formed in a sub yoke of the heat-assisted magnetic recording head of FIG. 2, according to an exemplary embodiment of the present invention.
Figure 4A:
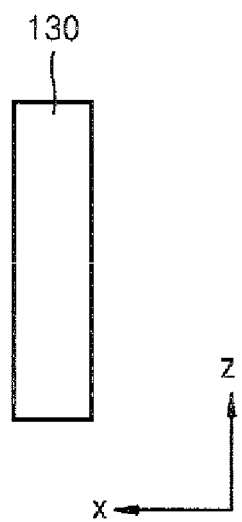
FIG. 4A is a schematic diagram illustrating a section of the waveguide of FIG. 3, according to an exemplary embodiment of the present invention.
Figure 4B:
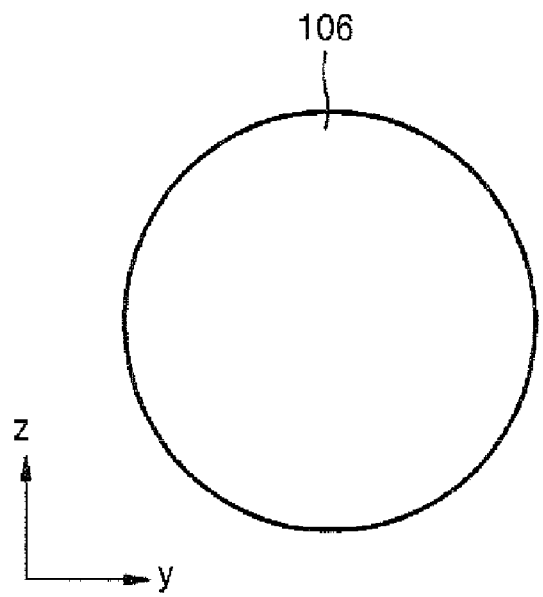
FIG. 4B is a schematic diagram illustrating a section of an optical fiber of the recording apparatus of FIG. 2, according to an exemplary embodiment of the present invention.
Figure 5:
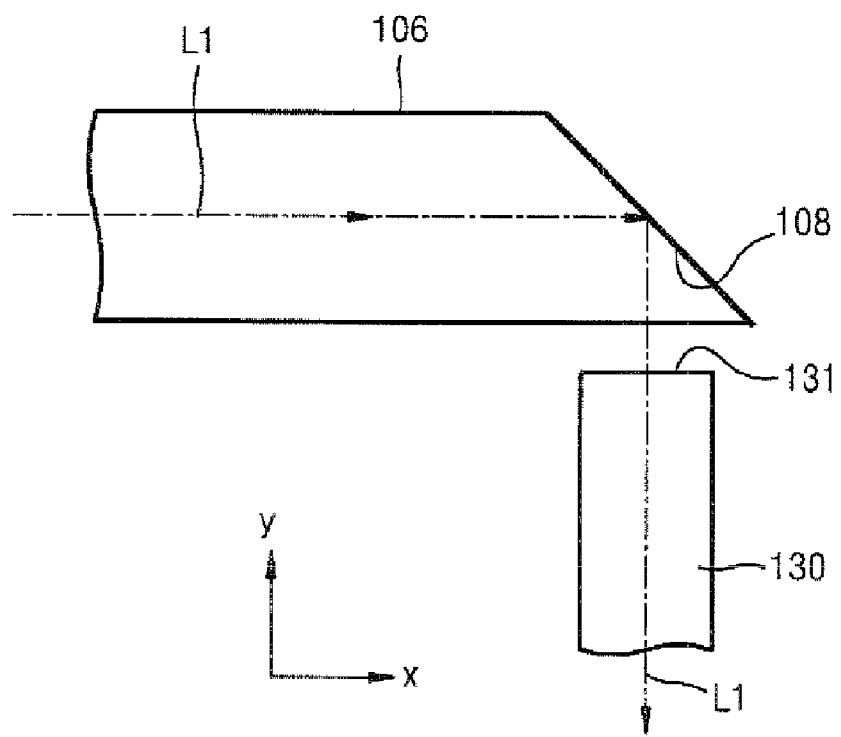
FIG. 5 is a sectional view illustrating an optical coupling structure between the optical fiber and the waveguide of FIG. 3, according to an exemplary embodiment of the present invention.

FIG. 2 is a perspective view illustrating a heat-assisted magnetic recording head 120 according to an exemplary embodiment of the present invention and a recording apparatus 100 including the heat-assisted magnetic recording head 120, according to an exemplary embodiment of the present invention. FIG. 3 is a sectional view illustrating a waveguide 130 formed in a sub yoke 127 of the heat-assisted magnetic recording head 120 of FIG. 2, according to an exemplary embodiment of the present invention. FIGS. 4A and 4B are schematic diagrams illustrating a section of the waveguide 130 and a section of a Graded Index (GRIN) fiber 106 of the recording apparatus 100 respectively. FIG. 5 is a sectional view illustrating an optical coupling structure between the GRIN fiber 106 and the waveguide 130, according to an embodiment of the present invention.

Referring to FIGS. 2 and 3, the recording apparatus 100 according to an exemplary embodiment of the present invention includes a magnetic recording medium 101, a slider 110 disposed to be able to move to a particular track of the magnetic recording medium 101 while maintaining a slightly floated state with respect to the magnetic recording medium 101, and a heat-assisted magnetic recording head 120 disposed on one side of the slider 110. The slider 110 is attached to and supported by a suspension (not shown), and the suspension elastically presses the slider 110 toward the magnetic recording medium 101. A surface of the slider 110 facing the magnetic recording medium 101 is formed to be an air-bearing surface (ABS, not shown). The slider 110 may be formed of AlTiC.

During the operation of the recording apparatus 100, the magnetic recording medium 101 rotates at high speed, and therefore air flows at high speed between the air-bearing surface of the slider 110 and the magnetic recording medium 101. While passing beneath the air-bearing surface of the slider 110, the high-speed airflow provides an upward force to the slider 110, such that the slider 110 separates further from the magnetic recording medium 101. The slider 110 maintains a floating state at a height at which the upward force and the elastic pressure of the suspension (not shown) elastically supporting the slider 110 can be in an equilibrium state. In this state, the heat-assisted magnetic recording head 120 performs a function of recording information to a particular track of the magnetic recording medium 101, or reproducing recorded information from a particular track of the magnetic recording medium 101. Even though not shown in FIG. 2, the magnetic recording medium 101 is disposed in the XY-plane under the slider 110, and the direction of relative movement of the magnetic recording medium 101 with respect to the slider 110 is the +X-direction.

The heat-assisted magnetic recording head 120 includes a recording portion 122 for producing a magnetic field to record information to the magnetic recording medium 101, a reproducing portion 145 for reproducing information recorded in the magnetic recording medium 101, and a waveguide 130 between the recording portion 122 and the reproducing portion 145. The recording portion 122 includes a main pole 124 for applying a magnetic field to the magnetic recording medium 101, a return yoke 125 forming a magnetic path together with the main pole 124, and a coil 123 for inducing a magnetic field around the main pole 124. As the magnetic recording medium 101 is magnetized by a leakage magnetic flux leaking downward from the main pole 124, information can be recorded to the magnetic recording medium 101. The reproducing portion 145 includes a pair of parallel shields 146, and a reproducing sensor 148, such as a great magneto-resistive (GMR) sensor, interposed between the pair of parallel shields 146. The pair of parallel shields 146 may be made of a magnetic material such as of FeNi.

The recording apparatus 100 further comprises a light source 105, and a GRIN fiber 106 as an example of an optical transmission medium for guiding a light beam L1 emitted by the light source 105 to the waveguide 130 of the heat-assisted magnetic recording head 120. The light source 105 may include a laser diode (LD) radiating laser. At least a portion of the GRIN fiber 106 such as an end portion of the GRIN fiber 106 adjacent to the slider 110 is supported by the suspension (not shown) for supporting the slider 110.

The sub yoke 127 may be interposed between the main pole 124 and the reproducing portion 145, and the waveguide 130 is layered at the same layer as the sub yoke 127. The sub yoke 127 enhances converging efficiency of the magnetic field of the main pole to increase the leakage magnetic flux. Even though not shown in FIG. 2, alumina ($Al_2O_3$) is filled in a vacant space of the heat-assisted magnetic recording head 120 to form a protective layer.

The waveguide 130 includes a light incident surface 131 (see FIG. 3) on which the light beam L1 passing through the GRIN fiber 106 is incident, a tapered portion 132 which has progressively narrower sections the further away the light beam travels from the light incident surface 131, an S-shaped bent portion 134 at the end of the tapered portion 132, a light-emitting surface 138 for emitting the light beam L1 to the magnetic recording medium 101, and a light reflective surface 137 disposed at an end of the S-shaped bent portion 134.

The waveguide 130 has a rectangular section whose Z-direction length is relatively greater than its X-direction length, as illustrated in FIG. 4A. This is intended to increase the polarization ratio of the incident light beam L1. However, the present invention is not limited thereto, and the waveguide 130 may have a rectangular section whose X-direction length is relatively greater than its Z-direction length.

However, the GRIN fiber 106 has a circular section, as illustrated in FIG. 4B. Since such a difference in the shape of sections may result in loss of light in the optical coupling process of the light beam L1 which is emitted from the GRIN fiber 106 and travels to the waveguide 130, the waveguide 130 comprises the tapered portion 132 to be able to reduce the loss of light. The tapered portion 132 is formed to become progressively narrower along the transmission direction (—Y-direction) of the light beam L1 incident on the light incident surface 131 to enter the waveguide 130. Thus, the section of the light incident surface 131 becomes wider when compared with the conventional case, and therefore loss of light in the process of optical coupling can be reduced.

Assuming that one surface of the heat-assisted magnetic recording head 120 facing the magnetic recording medium 101 is a lower side surface, the light incident surface 131 is disposed on a left side surface or right side surface of the heat-assisted magnetic recording head 120, and the end portion of the GRIN fiber 106 is disposed at a left or right side of the heat-assisted magnetic recording head 120 to be adjacent to the light incident surface 131.

Referring to FIG. 5, a light reflective surface 108 at the end of the GRIN fiber 106 is formed by cutting the GRIN fiber 106 at an angle of 45° with respect to a lengthwise direction (X-direction), and applying a high reflection (HR) coating to the cut surface. The light beam L1 emitted by the light source 105 (please refer to FIG. 2) is transmitted through the GRIN fiber 106, is reflected off the light reflective surface 108, travels in the—Y-direction, and is incident on the light incident surface 131 of the waveguide 130 to enter the waveguide 130. Since the light reflective surface 108 redirects the light beam L1 toward the light incident surface 131 of the waveguide 130, a separate collimating means is not required, and therefore the structure of the heat-assisted magnetic recording head 120 can be simple.

In addition, it is known that when the size of a light beam is larger than a normal size, an angular alignment tolerance can be reduced in the optical coupling process. This means that even a minute variation in an incident angle of the light beam L1 may result in a relatively large amount of light loss when the size of the light beam is large, and this means that optical coupling efficiency decreases. As described above, since, with the recording apparatus 100 according to an exemplary embodiment of the present invention, light loss can be reduced in the optical coupling process from the GRIN fiber 106 to the waveguide 130, it is not required to make the size of the light beam large in consideration of light loss. Consequently, since an angular alignment tolerance can become relatively larger than that of the related art, optical coupling efficiency can be enhanced.

The GRIN fiber 106 is an optical fiber whose refractive indices decrease gradually in radial directions from a center portion to circumferential portions. The GRIN fiber 106 has a self-focusing function, and therefore the light beam L1 reflecting off the light reflective surface 108 and incident on the light incident surface 131 of the waveguide 130 converges to the center of the light incident surface 131. Therefore, light loss can be reduced more in the process of optical coupling. In addition, since a separate focusing lens is not required, the structure of the heat-assisted magnetic recording head 120 according to the current exemplary embodiment of the present invention can be further simplified.

However, the optical transmission medium is not limited to the GRIN fiber 106, and may comprise, for example, a step index fiber and a GRIN (graded index) lens connected to one end of the step index fiber.

Again, referring to FIGS. 2 and 3, the S-shaped bent portion 134 of the waveguide 130 extends from the end of the tapered portion 132 to nearly the lower side surface of the sub yoke 127 facing the magnetic recording medium 101. Curvatures of two bent portions 135 and 136 of the S-shaped bent portion 134 are determined such that light loss of the light beam L1 that is transmitted through the S-shaped bent portion 134 can be minimized. The light reflective surface 137 of the end of the S-shaped bent portion 134 is cut at an angle of 45° with respect to the lengthwise direction (Y-direction) similar to the light reflective surface 108 (please refer to FIG. 5) of the GRIN fiber 106, and a high reflection (HR) coating is applied to the cut surface of the light reflective surface 137. The light beam L1 is reflected off the light reflective surface 137 in a—Z-direction and is transmitted through the light-emitting surface 138.

The S-shaped bent portion 134 is intended to make a distance A1 from the magnetic recording medium 101 to the lower end of the light incident surface 131 be equal to or greater than a distance A2 from the magnetic recording medium 101 to the light-emitting surface 138. If there were no bent portion 134 in the waveguide 130, the tapered portion 132 would become so close to the magnetic recording medium 101 that the waveguide 130 could easily collide with the magnetic recording medium 101 during the operation of the recording apparatus 100, or the light-emitting surface 138 would be separated so much from the magnetic recording medium 101 that the intensity of the light beam L1 irradiating the magnetic recording medium 101 could be weakened.

The heat-assisted magnetic recording head 120 further comprises a nano-aperture 140 under the light-emitting surface 138 of the waveguide 130. The nano-aperture 140 produces an enhanced near-field by changing optical energy distribution of the light beam L1 transmitted through the waveguide 130.

Figure 6:
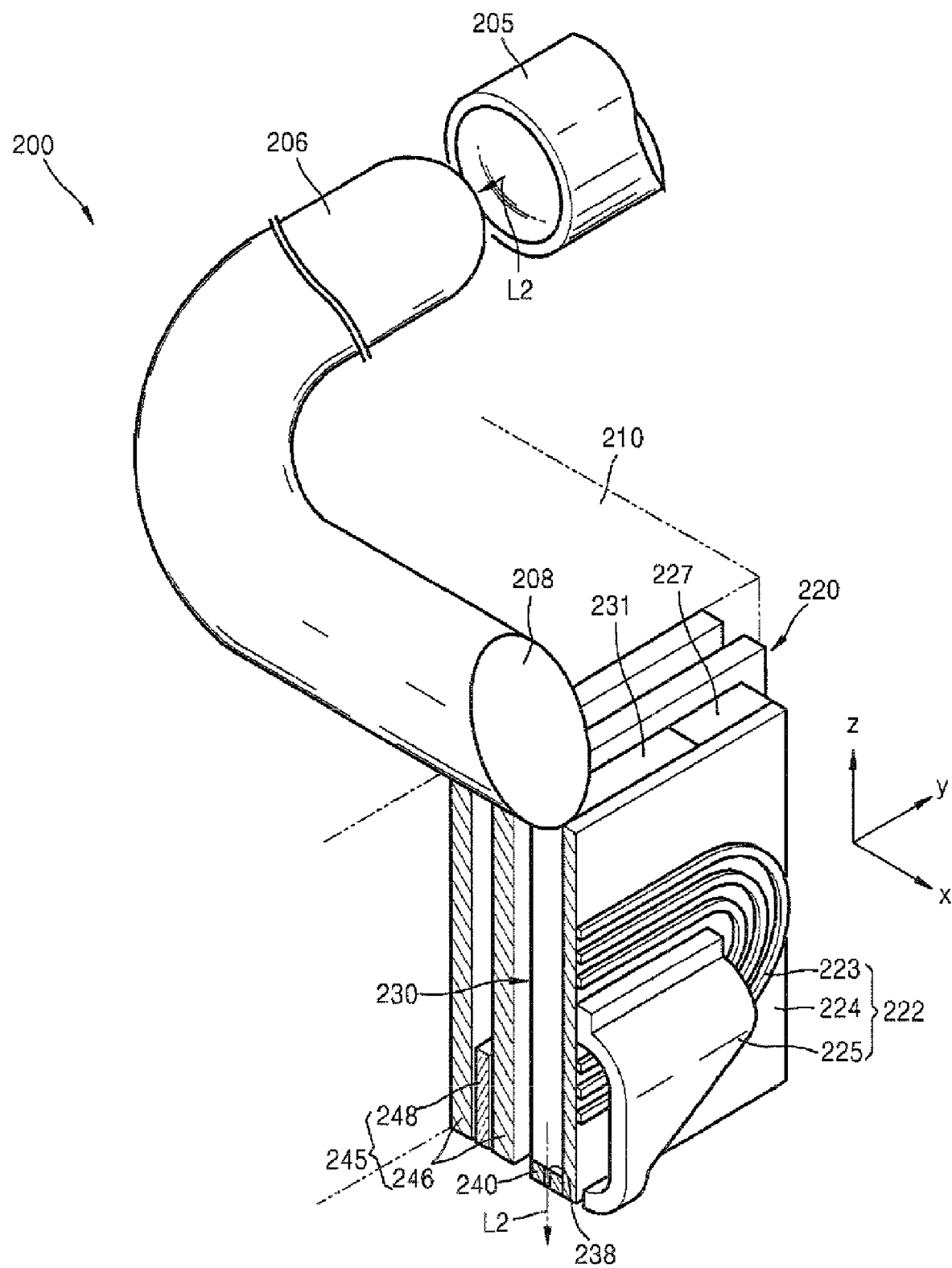
FIG. 6 is a perspective view illustrating a heat-assisted magnetic recording head according to another exemplary embodiment of the present invention, and a recording apparatus including the heat-assisted magnetic recording head, according to another exemplary embodiment of the present invention.
Figure 7:
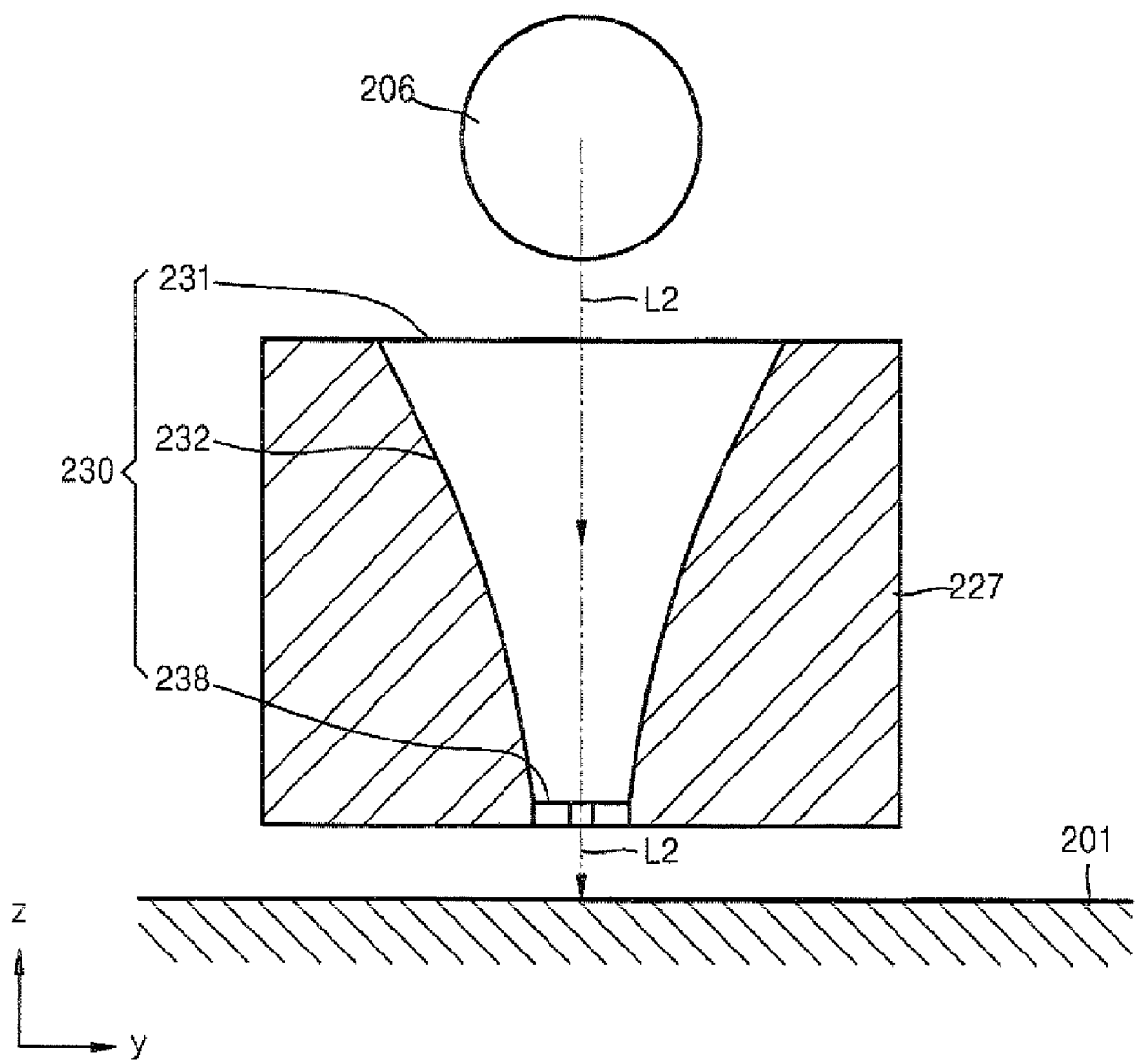
FIG. 7 is a sectional view illustrating a waveguide formed in a sub yoke of the heat-assisted magnetic recording head of FIG. 6, according to another exemplary embodiment of the present invention.

FIG. 6 is a perspective view illustrating a heat-assisted magnetic recording head 220 according to another exemplary embodiment of the present invention, and a recording apparatus including the heat-assisted magnetic recording head 220, according to another exemplary embodiment of the present invention. FIG. 7 is a sectional view illustrating a waveguide 230 formed in a sub yoke 227 of the heat-assisted magnetic recording head 220 of FIG. 6, according to an exemplary embodiment of the present invention.

Referring to FIGS. 6 and 7, the recording apparatus 200 according to an exemplary embodiment of the present invention includes a magnetic recording medium 201, a slider 210 disposed to be able to move to a particular track of the magnetic recording medium 201 while maintaining a floating state from the magnetic recording medium 201, the heat-assisted magnetic recording head 220 installed on one side of the slider 210, and a suspension (not shown) for supporting the slider 210 and elastically forcing the slider 210 toward the magnetic recording medium 201 at the same time. The slider 210 may be formed of AlTiC.

The heat-assisted magnetic recording head 220 includes a recording portion 222 for producing a magnetic field to record information to the magnetic recording medium 201, a reproducing portion 245 for reproducing information recorded in the magnetic recording medium 201, and the waveguide 230 between the recording portion 222 and the reproducing portion 245. Similar to the heat-assisted magnetic recording head 120 of FIGS. 2 and 3, the recording portion 222 includes a main pole 224, a return yoke 225, and a coil 223, and the reproducing portion 245 includes a pair of parallel shields 246, and a reproducing sensor 248 interposed between the pair of parallel shields 246.

The recording apparatus 200 further comprises a light source 205, and a GRIN fiber 206 as an example of an optical transmission medium for guiding a light beam L2 emitted by the light source 205 to the waveguide 230 of the heat-assisted magnetic recording head 220. The GRIN fiber 206 is supported by the suspension (not shown) for supporting the slider 210. While the slider 210 is attached to the lower side of the suspension and is supported by the suspension, the GRIN fiber 206 is attached to the upper side of the suspension and is supported by the suspension, and emits the light beam L2 toward the waveguide 230 from the end portion thereof The waveguide 230 may be formed in the sub yoke 227 which is interposed between the main pole 224 and the reproducing portion 245.

The waveguide 230 includes a light incident surface 231 on which the light beam L2 transmitted through the GRIN fiber 206 is incident, a tapered portion 232 which has progressively narrower sections along the transmission direction of the light beam L2, and a light-emitting surface 238 disposed at an end of the tapered portion 232 for emitting the light beam L2 toward the magnetic recording medium 201.

Assuming that one surface of the heat-assisted magnetic recording head 220 facing the magnetic recording medium 201 is a lower side surface, the light incident surface 231 is disposed on an upper side surface of the heat-assisted magnetic recording head 220, and the end portion of the GRIN fiber 206 is disposed at an upper side of the heat-assisted magnetic recording head 220 to be adjacent to the light incident surface 231.

Figure 8:
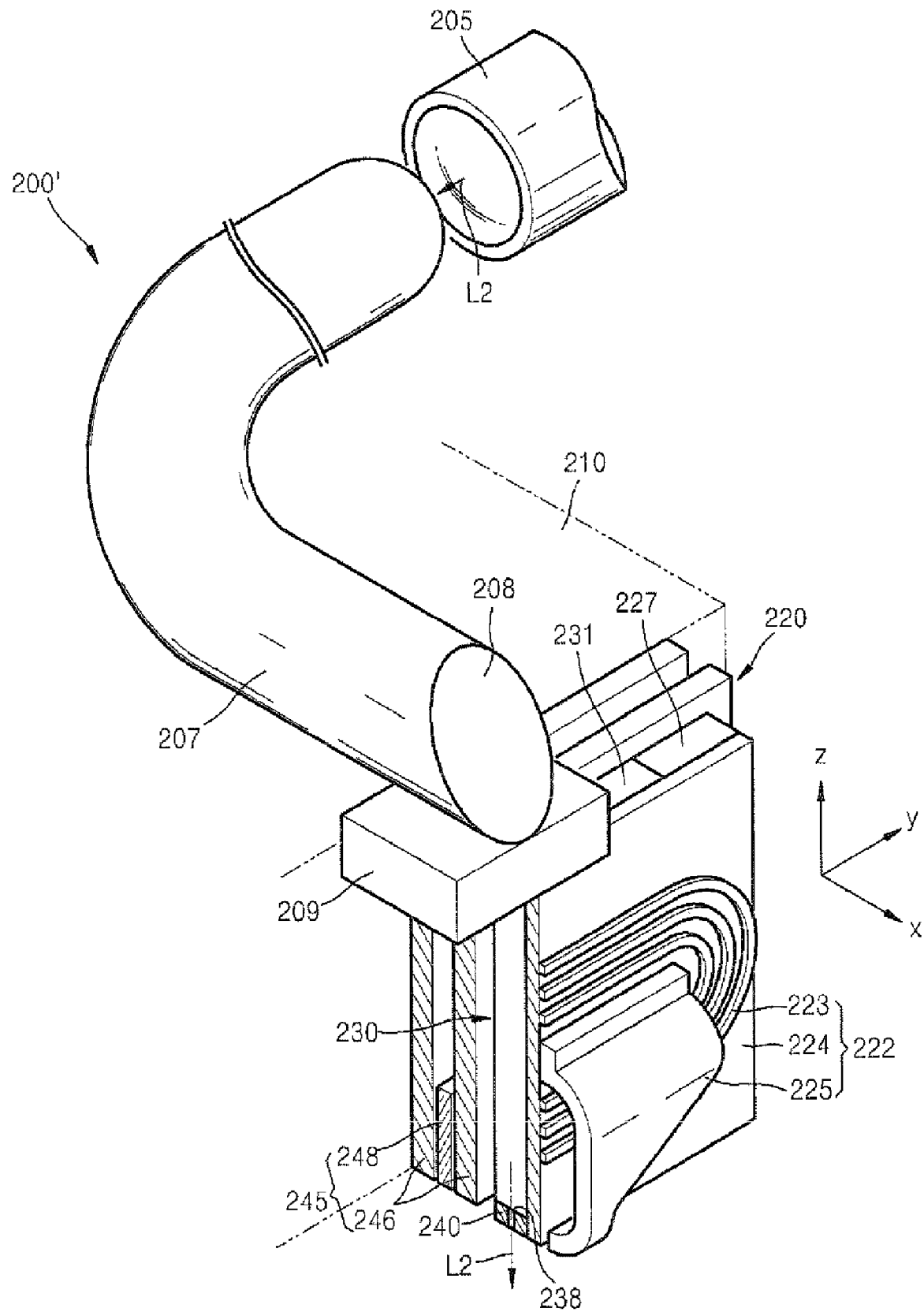
FIG. 8 is a perspective view illustrating a heat-assisted magnetic recording head and a recording apparatus according to still another exemplary embodiment of the present invention.

Referring to FIG. 6, a light reflective surface 208 at the end of the GRIN fiber 206 is formed by cutting the GRIN fiber 206 at an angle of 45° with respect to a lengthwise direction (X-direction), and applying a high reflection (HR) coating to the cut surface. The light beam L2 emitted by the light source 205 is transmitted through the GRIN fiber 206, is reflected off the light reflective surface 208 in the—Z-direction, and is incident on the light incident surface 231 of the waveguide 230 to enter the waveguide 230. However, as shown in FIG. 8 which illustrates a recording apparatus 200' according to an alternative embodiment, the optical transmission medium is not limited to the GRIN fiber 206, and may comprise, for example, a step index fiber 207 and a GRIN lens 209 connected to one end of the step index fiber.

The heat-assisted magnetic recording head 220 further comprises a nano-aperture 240 under the light-emitting surface 238. The nano-aperture 240 produces an enhanced near-field by changing optical energy distribution of the light beam L2 transmitted through the waveguide 230.

Consistent with the present invention, since a light incident surface of a waveguide can be enlarged, light loss in the optical coupling process can be prevented. In addition, since a complicated collimating means for optical coupling is not required, the structure of a heat-assisted magnetic recording head can be simple.

Further, consistent with the present invention, since a tapered portion of a waveguide is not projected toward a magnetic recording medium, the possibility of damage due to a collision of a slider with the magnetic recording medium is reduced.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A heat-assisted magnetic recording head comprising:
   a recording portion which produces a magnetic field for recording information to a magnetic recording medium; and
   a waveguide which transmits light therethrough disposed to be adjacent to the recording portion and which emits the light toward the magnetic recording medium,
   wherein the waveguide comprises:
   a light incident surface;
   a tapered portion having progressively narrower sections along the transmission direction of light incident on the light incident surface;
   a light-emitting surface which emits the light after the light is transmitted through the tapered portion; and
   an S-shaped bent portion at the end of the tapered portion, wherein the S-shaped bent portion is disposed inside the heat-assisted magnetic recording head.

2. The heat-assisted magnetic recording head of claim 1, wherein the distance from the magnetic recording medium to a lower end of the light incident surface is equal to or greater than the distance from the magnetic recording medium to the light-emitting surface.

3. The heat-assisted magnetic recording head of claim 2, wherein the waveguide further comprises a light reflective surface at an end of the S-shaped bent portion for redirecting the light toward the light-emitting surface.

4. The heat-assisted magnetic recording head of claim 1, wherein when one surface of the heat-assisted magnetic recording head facing the magnetic recording medium is a lower side surface, the light incident surface is disposed on an upper side surface of the heat-assisted magnetic recording head.

5. The heat-assisted magnetic recording head of claim 1, wherein the head further comprises a reproducing portion for reproducing information recorded in the magnetic recording medium, such that the waveguide is interposed between the recording portion and the reproducing portion.

6. The heat-assisted magnetic recording head of claim 1, wherein the head further comprises a nano-aperture for producing an enhanced near-field by changing energy distribution of the light emitted through the light-emitting surface.

7. A recording apparatus comprising:
a magnetic recording medium,
a heat-assisted magnetic recording head operative to float on the magnetic recording medium for recording information to the magnetic recording medium, and
a light source which emits light, and an optical transmission medium which guides the light emitted by the light source to the heat-assisted magnetic recording head,
wherein the heat-assisted magnetic recording head comprises:
  a recording portion which produces a magnetic field for recording information to the magnetic recording medium, and
  a waveguide disposed to be adjacent to the recording portion for receiving the light transmitted through the optical transmission medium and which emits the light toward the magnetic recording medium, and wherein the waveguide comprises a light incident surface on which the light which is transmitted through the optical transmission medium is incident;
  a tapered portion having progressively narrower sections along the transmission direction of the light incident on the light incident surface and entering the waveguide;
  a light-emitting surface which emits the light after the light is transmitted through the tapered portion; and
  an S-shaped bent portion at an end of the tapered portion, wherein the S-shaped bent portion is disposed inside the heat-assisted magnetic recording head.

8. The recording apparatus of claim 7, wherein the distance from the magnetic recording medium to a lower end of the light incident surface is equal to or greater than the distance from the magnetic recording medium to the light-emitting surface.

9. The recording apparatus of claim 8, wherein the waveguide further comprises a light reflective surface at an end of the S-shaped bent portion for redirecting the light toward the light-emitting surface.

10. The recording apparatus of claim 7, wherein when one surface of the heat-assisted magnetic recording head facing the magnetic recording medium is a lower side surface, the light incident surface is disposed on an upper side surface of the heat-assisted magnetic recording head.

11. The recording apparatus of claim 7, wherein the heat-assisted magnetic recording head further comprises a reproducing portion for reproducing information recorded in the magnetic recording medium, such that the waveguide is interposed between the recording portion and the reproducing portion.

12. The recording apparatus of claim 7, wherein the heat-assisted magnetic recording head further comprises a nano-aperture for producing an enhanced near-field by changing energy distribution of the light emitted through the light-emitting surface.

13. The recording apparatus of claim 7, wherein the optical transmission medium comprises a Graded Index (GRiN) fiber whose refractive indices decrease gradually in radial directions from a center portion to circumferential portions of the GRiN fiber.

14. The recording apparatus of claim 7, wherein the optical transmission medium comprises a step index fiber and a GRiN lens connected to an end of the step index fiber.

15. The recording apparatus of claim 7, wherein the optical transmission medium further comprises a light reflective surface at an end thereof for redirecting light toward the light incident surface of the waveguide.

* * * * *